United States Patent
Friggstad

(10) Patent No.: US 8,215,413 B2
(45) Date of Patent: Jul. 10, 2012

(54) BOOM STABILIZATION METHOD FOR NARROW TRANSPORT IMPLEMENT

(75) Inventor: Terrance A. Friggstad, Saskatchewan (CA)

(73) Assignee: CNH Canada, Ltd. (CA)

(*) Notice: Subject to any disclaimer, the term of this patent is extended or adjusted under 35 U.S.C. 154(b) by 251 days.

(21) Appl. No.: 12/181,807

(22) Filed: Jul. 29, 2008

(65) Prior Publication Data

US 2010/0025056 A1 Feb. 4, 2010

(51) Int. Cl.
*A01B 63/00* (2006.01)
(52) U.S. Cl. .............. 172/452; 172/605; 172/311
(58) Field of Classification Search ......... 172/311, 172/452, 456, 605, 776
See application file for complete search history.

(56) References Cited

U.S. PATENT DOCUMENTS

| | | | |
|---|---|---|---|
| 1,297,601 A | 3/1919 | Sherwin | |
| 2,599,251 A | 6/1952 | Garrett | |
| 2,966,219 A * | 12/1960 | French | 172/289 |
| 2,973,818 A * | 3/1961 | Marvin | 172/456 |
| 3,288,480 A | 11/1966 | Calkins et al. | |
| 3,333,645 A * | 8/1967 | Gustafson | 172/456 |
| 3,539,016 A * | 11/1970 | Bauer et al. | 172/311 |
| 3,548,954 A * | 12/1970 | Lindemann | 172/311 |
| 3,640,345 A * | 2/1972 | Sosalla | 172/311 |
| 3,810,660 A * | 5/1974 | Peterson | 172/272 |
| 3,841,412 A * | 10/1974 | Sosalla | 172/311 |
| 4,286,672 A | 9/1981 | Forsyth et al. | |
| 4,308,920 A * | 1/1982 | Floyd et al. | 172/328 |
| 4,425,857 A | 1/1984 | Lienemann et al. | |
| 4,425,971 A * | 1/1984 | Allen | 172/311 |
| 4,813,489 A * | 3/1989 | Just et al. | 172/175 |
| 4,896,732 A * | 1/1990 | Stark | 172/311 |
| 5,161,622 A | 11/1992 | Godbersen | |
| 5,357,884 A | 10/1994 | Bourgault | |
| 5,429,195 A * | 7/1995 | Turnis | 172/311 |
| 5,809,914 A * | 9/1998 | Follmer | 111/56 |
| 5,839,516 A * | 11/1998 | Arnold et al. | 172/456 |
| 6,035,942 A * | 3/2000 | Smith et al. | 172/311 |
| 6,035,943 A * | 3/2000 | Gerein et al. | 172/328 |
| 6,269,886 B2 | 8/2001 | Friggstad | |
| 6,397,953 B1 * | 6/2002 | Ankenman | 172/445.1 |
| 6,561,283 B2 | 5/2003 | Hundeby | |
| 6,902,010 B2 | 6/2005 | Shoup | |
| 7,549,482 B2 * | 6/2009 | Wake et al. | 172/311 |
| 2009/0229841 A1 * | 9/2009 | Dillon | 172/1 |

FOREIGN PATENT DOCUMENTS

EP 399914 11/1990

* cited by examiner

*Primary Examiner* — Thomas B Will
*Assistant Examiner* — Joel F. Mitchell
(74) *Attorney, Agent, or Firm* — Rebecca Henkel; Sue Watson

(57) ABSTRACT

An agricultural implement is provided with folding wing assemblies coupled to a central boom that provides a simplified arrangement for transporting the implement. The implement may include wing frames and row units that may be raised to allow the wing assemblies to fold rearwardly, into a compact, transport position. While being raised, prior to being folded rearwardly, the wing assemblies may be supported by the central boom, which is rigidly coupled to a central frame. The central boom is pivotally coupled to a hitch assembly.

18 Claims, 6 Drawing Sheets

BOOM STABILIZATION METHOD FOR NARROW TRANSPORT IMPLEMENT

BACKGROUND

The present invention relates generally to the field of agricultural implements such as planters and other wide foldable implements towed behind a work vehicle, such as a tractor. More particularly, the present invention relates to an improved arrangement and method for transporting implements.

A range of agricultural implements have been developed and are presently in use for tilling, planting, harvesting, and so forth. Planters, for example, are commonly towed behind tractors and may cover wide swaths of ground which may be tilled or untilled. Such devices typically open the soil, dispense seeds in the soil opening, and re-close the soil in a single operation. In planters, seeds are commonly dispensed from bulk seed tanks and distributed to row units by a distribution system. To make the planting operation as efficient as possible, very wide swaths of ground may be covered by extending wings on either side of a central boom section of the implement pulled by the tractor. Included in the wing assemblies are generally booms, tool bars, row units, and support wheels. The wing assemblies/members and row units are disposed in a floating arrangement during the planting operation, wherein hydraulic cylinders allow the row unit implements to contact the soil with sufficient force to open the soil, dispense the seeds, and close the soil. Further, the floating arrangement enables the components to adjust and conform to the ground as the agricultural implement is towed across varying elevations. However, during the process of changing to a transport configuration, the rotation of the wing members to a vertical transport position may induce a torque to central frame members, such as a central boom, which results in a high negative load on the hitch and tow vehicle.

BRIEF DESCRIPTION

An agricultural implement is provided with folding wing assemblies coupled to a central boom that provides a simplified arrangement for transporting the implement. The implement may include wing frames and row units that may be raised to allow the wing assemblies to fold rearwardly, into a compact, transport position. While being raised, prior to being folded rearwardly, the wing assemblies may be supported by the central boom, which is rigidly coupled to a central frame. The central boom is pivotally coupled to a hitch assembly.

DRAWINGS

These and other features, aspects, and advantages of the present invention will become better understood when the following detailed description is read with reference to the accompanying drawings in which like characters represent like parts throughout the drawings, wherein.

Figure 1:
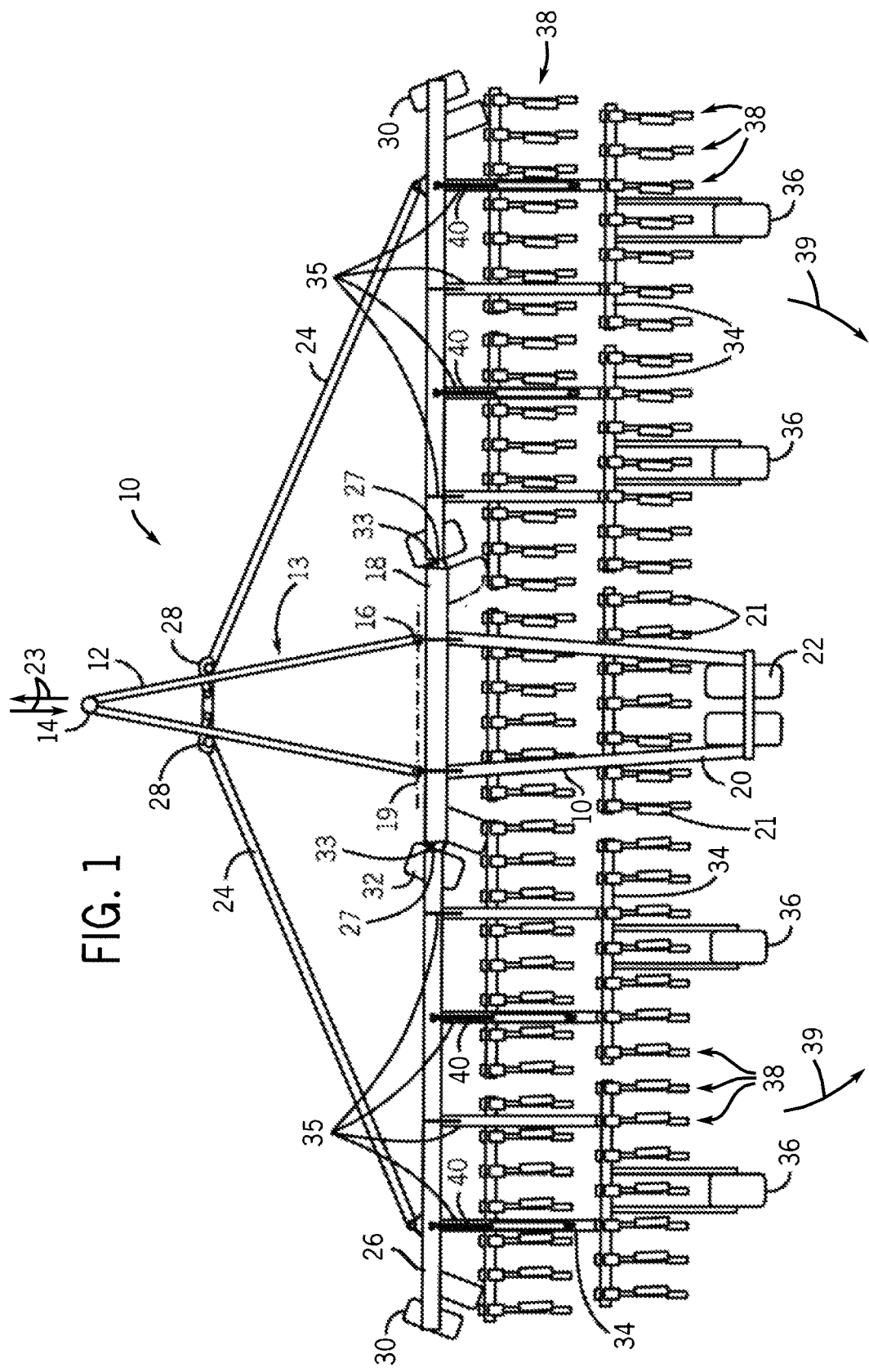
FIG. 1 is a top view of an embodiment of an agricultural implement illustrating an extended position of the implement and wing members.
Figure 5:
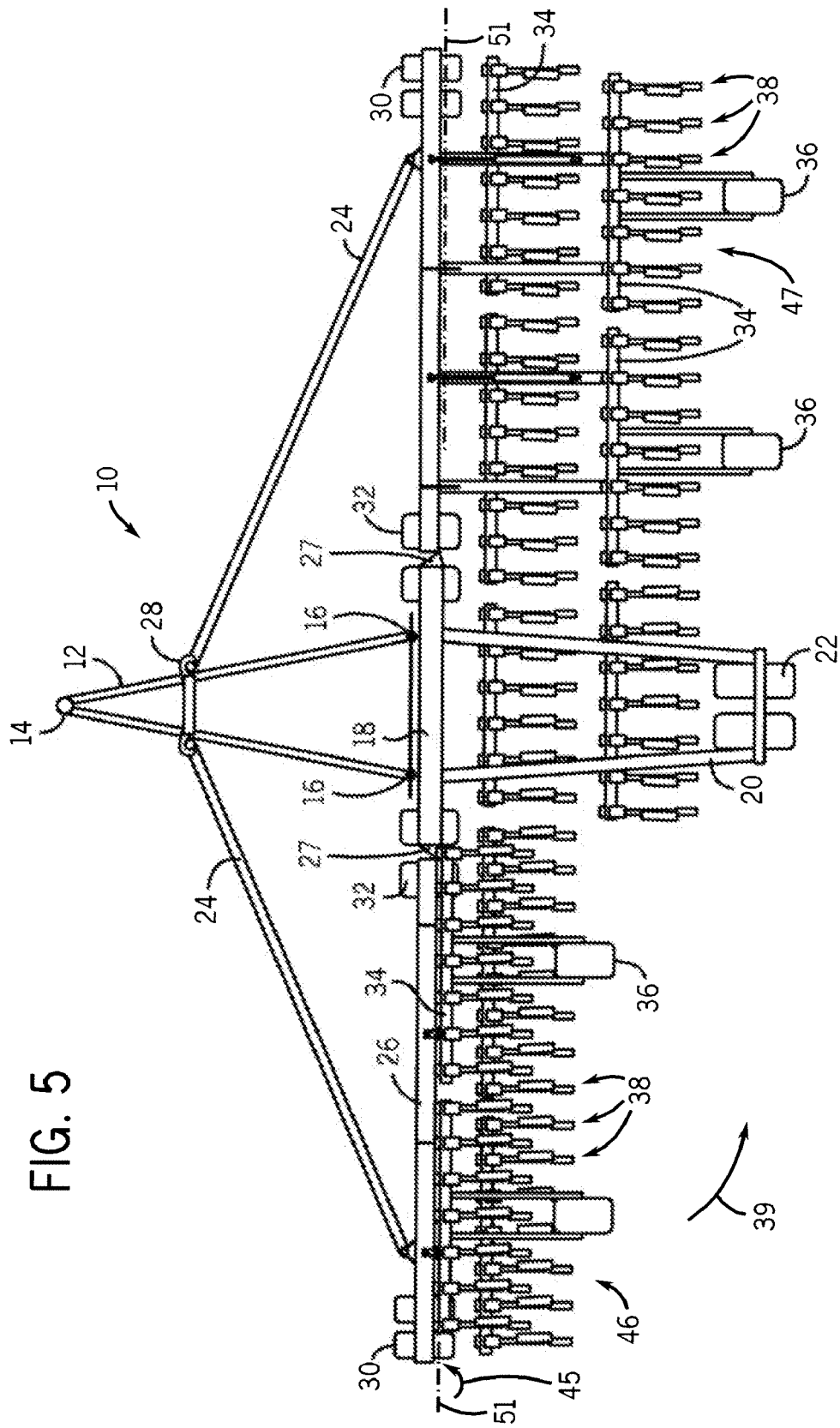
Figure 6:
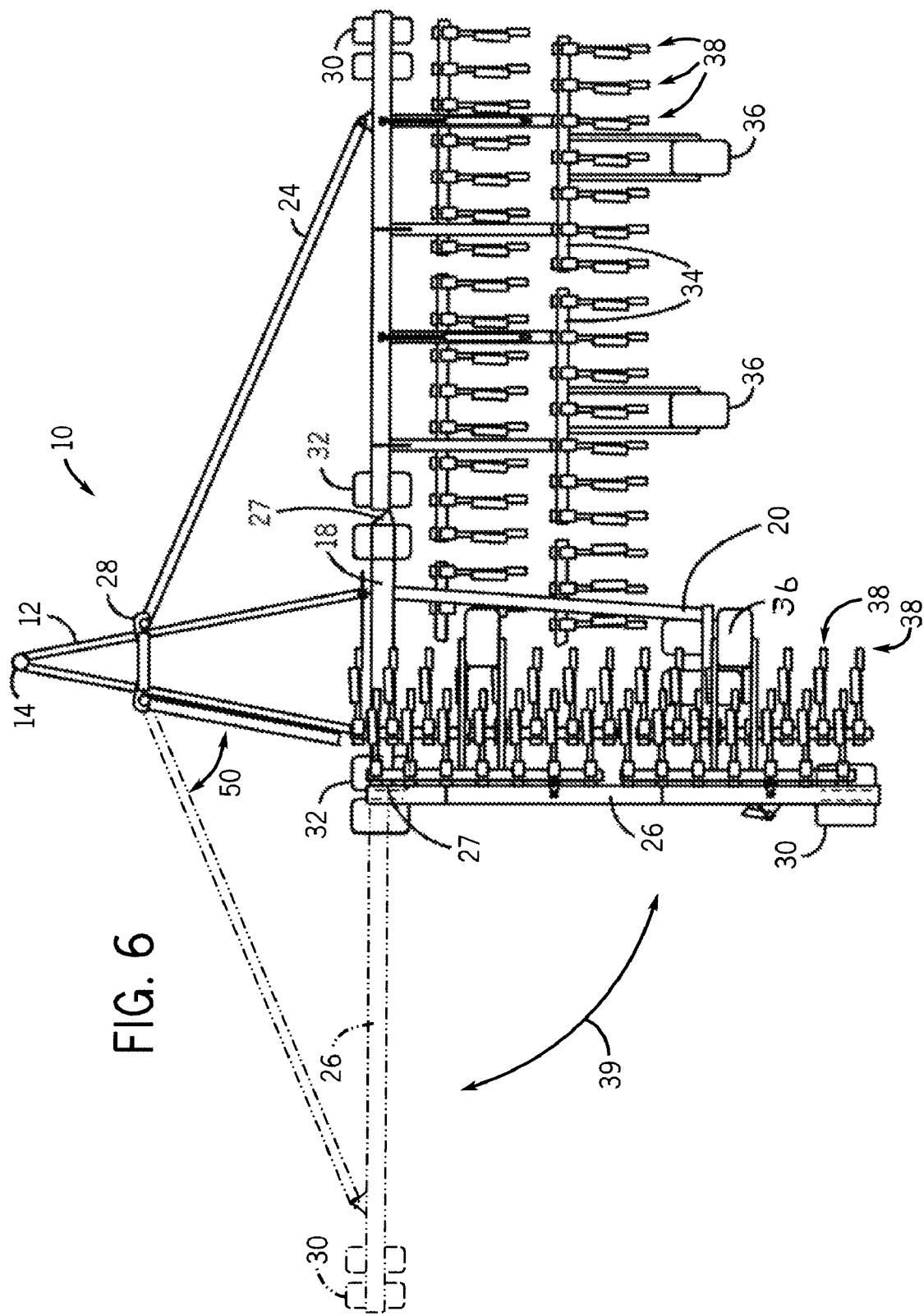

FIG. 5 is a top view of an embodiment of the agricultural implement shown in FIG. 1, illustrating a right wing member in an extended lowered position and a left wing member in an extended raised position; and FIG. 6 is a top view of an embodiment of the agricultural implement shown in FIG. 1, illustrating the right wing member in an extended lowered position and the left wing member in a folded raised position.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various configurations of implements may be employed to improve stability and reduce implement width during transport. For example, the embodiments discussed below may employ a pivotal hitch assembly coupled to a rigid central boom and rear frame, wing frames mounted on wings that are rearwardly foldable, support wheels to support the rear frame, and a coupling mechanism on the rear frame configured to support the wings when folded in a transport position. Specifically, in an embodiment, the wing frames are raised to a substantially vertical position before wing members folded rearwardly. As the wing frames are raised, a torque is transferred to the central boom, which is pivotally coupled to the hitch assembly. The wing members may then be positioned alongside the rear frame in a transport position, enabling a compact configuration during transport.

In accordance with embodiments of the invention, this arrangement enables a transition to a transport position while avoiding a negative load on the hitch and tractor that may occur if the central boom was rigidly coupled to the hitch assembly. The disclosed embodiments utilize an arrangement that includes a pivotal coupling between the hitch assembly and the central boom and rear frame, thereby eliminating a negative hitch load. As discussed below, the arrangement for transporting large agricultural implements improves control over the implement, reduces overall width during transport, and reduces overall costs and complexity.

Turning now to the drawings and referring first to FIG. 1, an agricultural implement 10, illustrated in the form of a planter, is shown from a top view. The implement 10 is designed to be towed behind a work vehicle such as tractor. The implement includes a hitch assembly 12 which is shown in the form of an A-frame hitch assembly 13. Hitch assembly 12 includes a hitch 14 that may be used to attach to an appropriate tractor hitch via a ball or other coupling. Hitch assembly 12 includes a pivotal coupling 16 to central boom 18. Pivotal coupling 16 is configured to rotate about on horizontal axis 19. The freedom of the coupling 16 to rotate about axis 19 enables the hitch 14 to transfer mainly lateral forces 23 to the tractor and eliminating a vertical force exerted upon hitch 14. Central boom 18 and hitch assembly 12 may be composed of an appropriate strong material such as steel or an alloy. Central boom 18 may be rigidly coupled to rear frame 20, which is aft of central boom 18. Rear frame 20 features rear support wheel 22, which may support central row units 21 that are coupled to rear frame 20. A negative hitch load is undesirable because it may produce a vertical force on the hitch assembly 12, which may upset a light tow vehicle attached to the implement 10 during raising of a wing assembly for transport.

Also attached to hitch assembly 12 are draft tubes 24, which are coupled to wing members 26 that are pivotally coupled via knuckle joint 27 on either side of central boom 18. Draft tubes 24 may be coupled to hitch assembly 12 via draft tube mounting assembly and joints 28, which allows implement 10 to fold to a transport position, as will be discussed in detail below. Pivotal coupling 16 enables a substantial load created by the raising of wing members 26 to be supported by rear frame 20 without adversely producing a negative hitch load on hitch assembly 12. In an embodiment, wing wheels 30 are attached to each end of wing members 26, thereby supporting the wing members 26 and their attachments while in the illustrated extended position or in a folded transport position. Central wheels 32 are also attached via casters or suitable pivot joints 33 to central boom 18, thereby supporting rear frame 20 and wing members 26. In addition, wing frames 34 are pivotally attached to wing members 26. In an embodiment, the pivotal coupling 35 between wing frames 34 and wing members 26 enables wing frames 34 to be raised for transport. Wing frame wheels 36 are rigidly coupled to and support wing frames 34. In addition, wing frames 34 and wing frame wheels 36 are coupled to and support wing row units 38. Wing frame actuators 40 are utilized in the present embodiment to raise wing frames 34 for transport.

In the illustrated embodiment, two wing frames 34 are disposed on each wing member 26, thereby supporting a plurality of wing row units 38. Depending on conditions, cost, and other factors, more or less wing frames 34 may be coupled to each wing member 26. Also featured in the embodiment are central row units 21 that are supported by rear frame 20. Depending upon the design of the row units and upon such factors as the nature of the field, each row unit may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit for receiving seeds, fertilizer or other materials to be dispensed by the row units. In the present embodiment, a distribution system serves to communicate seeds from bulk seed tanks to the various row units. As is shown in the diagram, wing members 26 are pivotally coupled, via joint 27, to central boom 18, thereby enabling wing members 26 to fold back 39 to a transport position. Actuators are pivotally coupled to wing members 26 and each wing frame 34 in order to raise wing frames 34 to a transport position. Further, additional actuators may be used to fold wing members 26 rearwardly to a transport position. As such, the actuators are not shown in the embodiment to enhance clarity. In the illustrated embodiment, the overall width of implement 10 makes the arrangement useful for farming, but difficult to transport, especially on roads. Accordingly, the arrangement and method provides improved stability during a transition to transport position.

Figure 2:
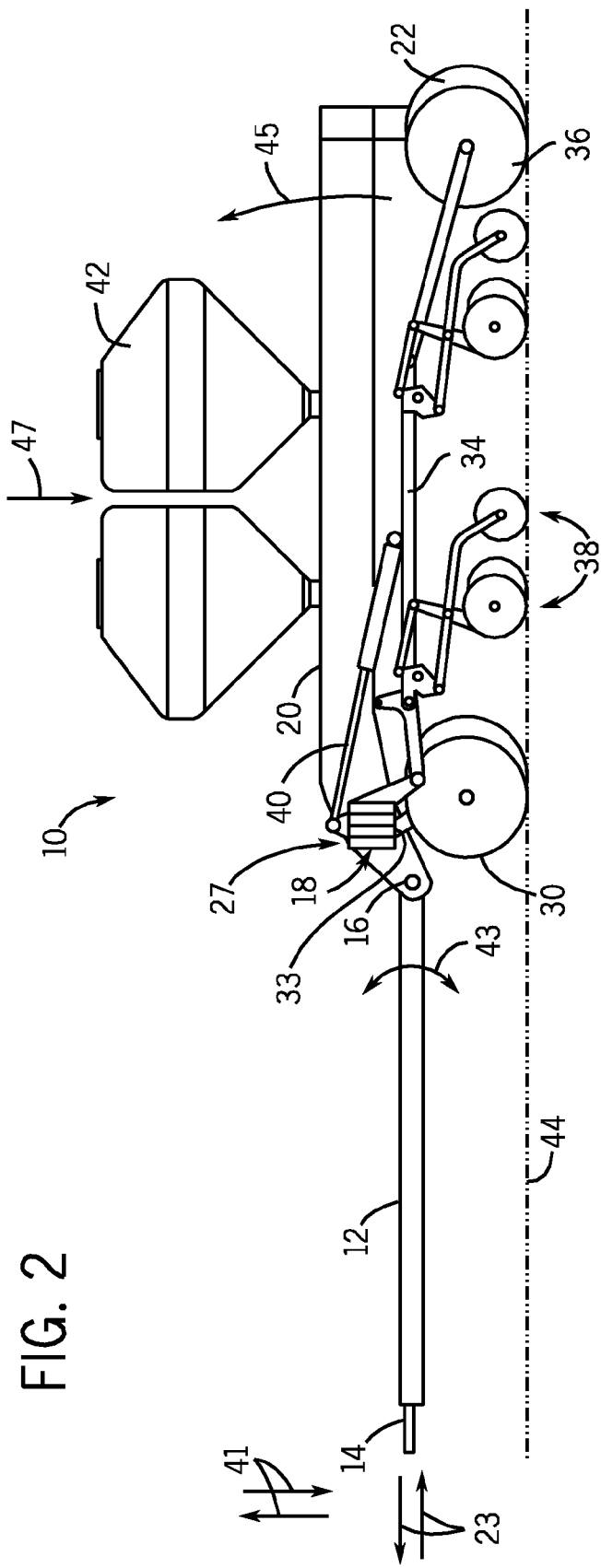
FIG. 2 is a side view of an embodiment of the agricultural implement shown in FIG. 1, illustrating the wing members extended and row units in contact with the ground.

The agricultural implement 10 is shown from a side view in FIG. 2. The embodiment shows bulk seed tanks 42 that are coupled to, and supported by, rear frame 20. Bulk seed tanks 42 may be located above rear frame 20 and central row units 21. The diagram shows that hitch assembly 12 is pivotally coupled to central boom 18, and thereby rear frame 20, via pivotal coupling 16, relieving a negative hitch load from the hitch assembly 12. Therefore, the load experienced by hitch assembly 12, especially when raising wing members 26, is primarily lateral load 23. Further, pivot 16 allows movement 43 of the hitch assembly 12, independent of rear frame 20. When filled with seed, bulk seed tanks 42 may produce a significant load 47 on rear frame 20, which is supported by central wheels 32 and rear support wheels 22. In particular, the load of most structures attached to rear frame 20 is carried by support wheels 22 and 32. Further, pivotal coupling 16 eliminates the amount of vertical loads supported by hitch assembly, enabling support wheels 22 and 32 to support vertical loads on frame 20. As will be discussed below, this load distribution enables support wheels 22, 30, and 32 to sustain most vertical loads caused by raised wing members 26 when in a transport position. As depicted rear support wheels 22 are rigidly coupled to rear frame 20, meaning that the rear support wheels 22 are stationary with respect to rear frame 20. Moreover, the rear support wheels 22 are not pivotal (e.g. they do not caster), meaning they generally operate within a constant vertical plane.

Also shown in the illustration is actuator 40, which may be attached to wing members 26 to raise 45 wing frames 34 to a substantially transverse position for transport. The actuators 40 may be hydraulic cylinders or any other suitable mechanism for lifting the wing frames 34. Wing frame wheels 36 are attached to the rear portion of wing frames 34 to support row units 38 as the implement 10 is towed across the field 44. In the embodiment, the row units 38 are deployed into a ground penetrating position, wherein disks and/or opening mechanisms may be used to open and seed the ground as the implement 10 is towed across the field 44.

Figure 3:
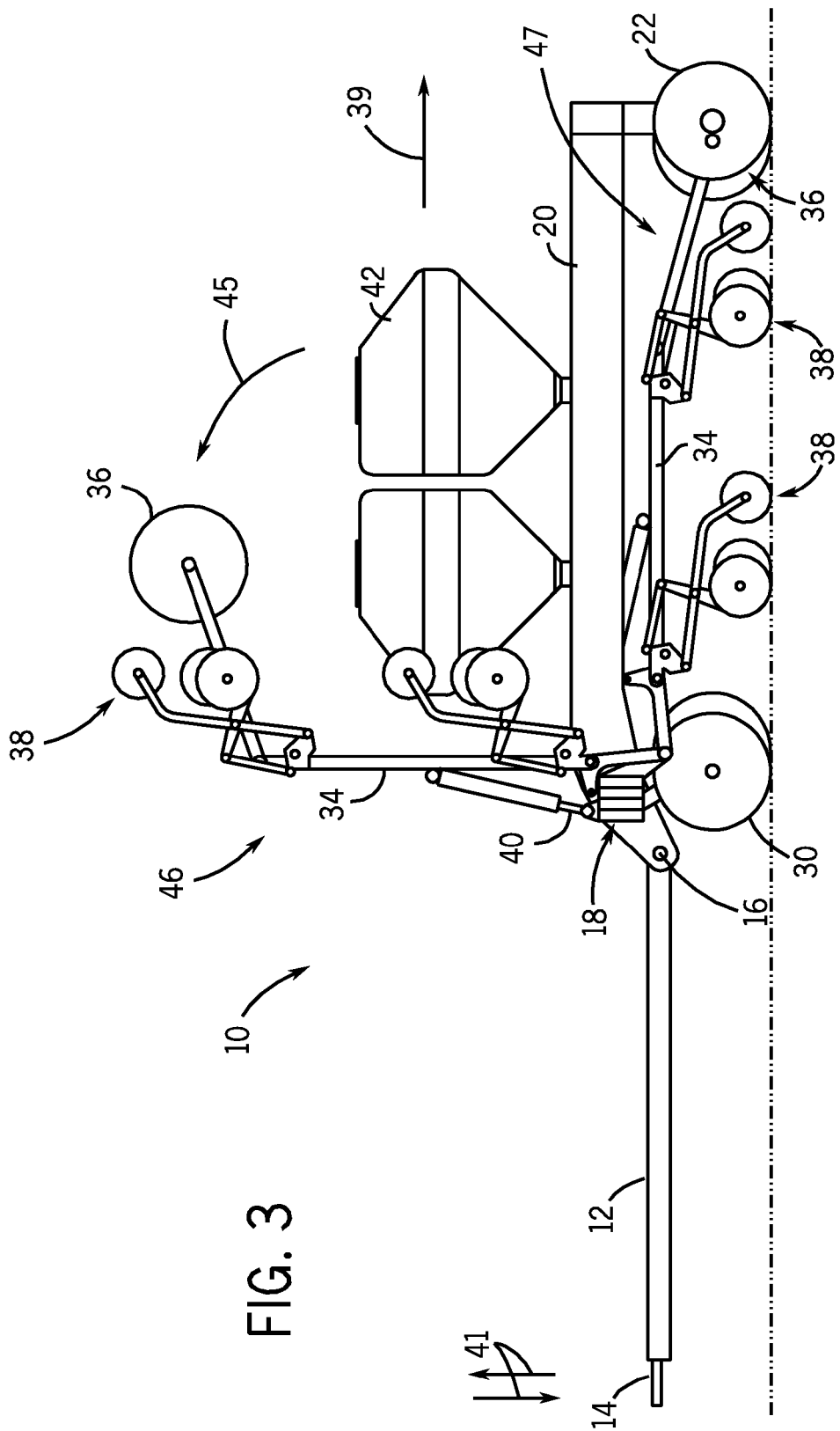
FIG. 3 is a side view of an embodiment of the agricultural implement shown in FIG. 1, illustrating the wing members in a raised position.

FIG. 3 shows a side view of the agricultural implement 10 with left wing frames 34 in a raised position or intermediate transport position 46. In the embodiment, left wing frames 34 are substantially transverse to both wing members 26 and rear frame 20. Left wing frames 34 are rotated or raised up about a horizontal axis as indicated by arrows 45, prior to being folded rearwardly 39, into a transport position (shown in FIGS. 4 and 5). The configuration of pivot 16 during this process eliminates a vertical hitch load 41 from being transferred via hitch assembly 12. In other words, the configuration of hitch assembly 12, central boom 18, and pivot 16 enables a torque created by raising wing frames 34 to a transport position 46 to be transferred to rigidly coupled central boom 18 and rear frame 20. The actuator 40 may be retracted in order to raise 45 wing frames 34 to the transport position 46. Left wing frame 34 is raised by actuator 40 along a horizontal axis that is substantially parallel to central boom 18. As depicted, right wing member 34 is in ground contacting position 47, e.g. it is not in a raised position 46.

Figure 4:
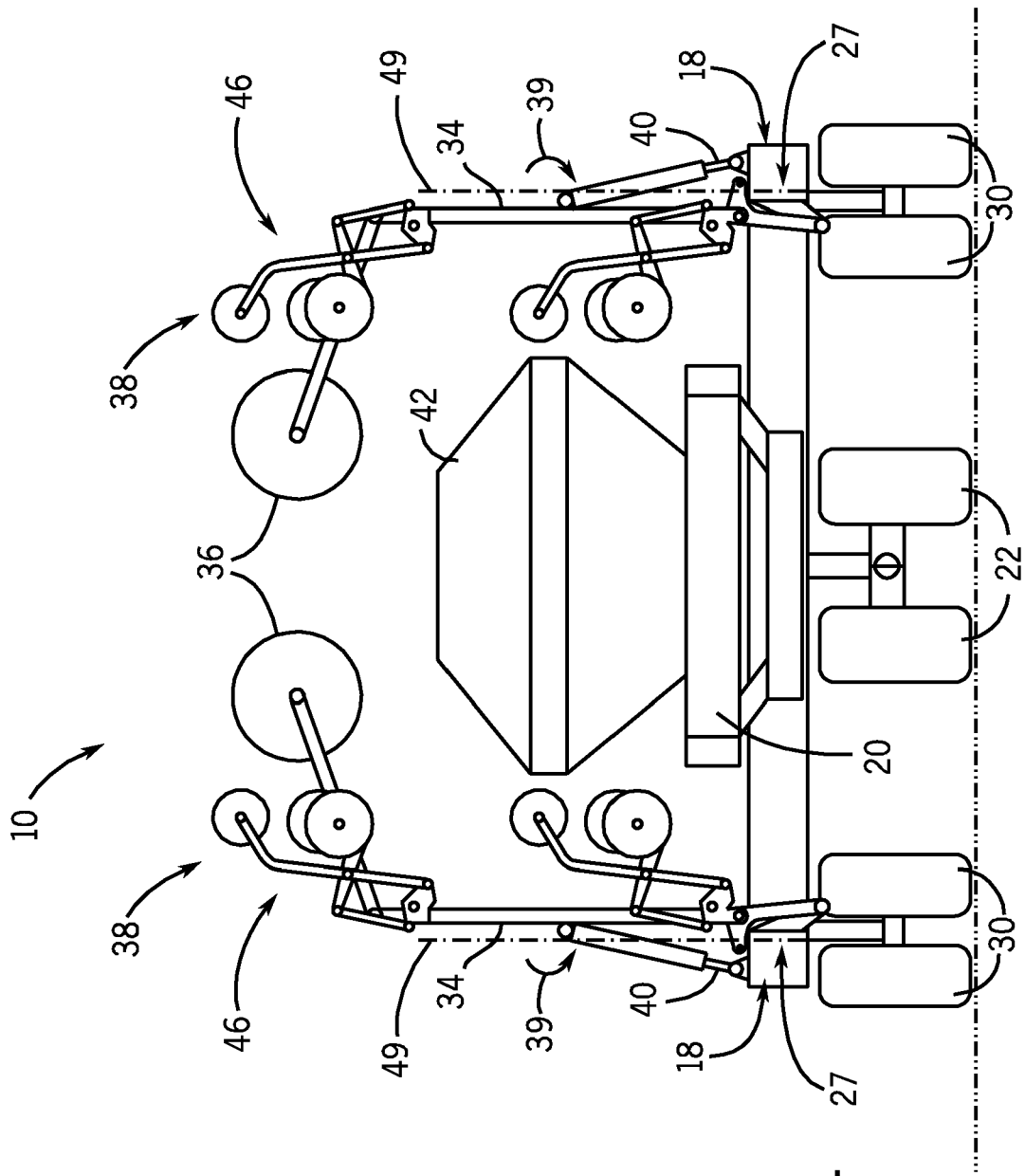
FIG. 4 is rear view of an embodiment of the agricultural implement shown in FIG. 1, illustrating the wing members in a raised position.

FIG. 4 shows a rear view of the agricultural implement 10 in a folded transport position with both wing frames 34 raised into transport position 46 and wing members 26 folded rearwardly 39 about vertical axis 49, thereby reducing the overall width of the implement. In the embodiment, wing members 26 are substantially transverse to central boom 18 and are adjacent to a portion of rear frame 20 to ensure narrow width during transport. Rear frame 20, central wheels 32, wheels 30, and rear support wheels 22 support a substantial portion of the vertical load of wing members 26, wing frames 34, and bulk seed tank 42, thereby reducing or eliminating a vertical load from being transferred via pivot 16 to hitch assembly 12.

FIG. 5 illustrates a top view of agricultural implement 10 with left wing member 26 having wing frames 34 in a raised position 46, transverse to the right frames 34 in a lowered ground contacting position 47. Right wing frames 34 are raised in direction 45, when they rotate about horizontal axis 51. The diagram has some elements removed for clarity, such as bulk seed tanks 42. The illustration shows the left wing member 26 extended, prior to folding rearwardly 39 to a transverse transport position. Also included in the illustration are rear frame 20, central boom 18, rear support wheels 22, and wheels 30, which together will bear a substantial portion of the vertical load of seed tanks 42 and wing members 26 when in a transport position.

FIG. 6 illustrates a top view of agricultural implement 10 with certain components, such as bulk seed tanks 42, removed to enhance clarity. In particular, the illustration shows left wing member 26 moved to a folded transport position as shown by arrow 39 and arrow 50. As is shown in the diagram, when fully folded, the wing member 26 is generally transverse to central boom 18 and may be located alongside rear frame 20 when in the folded transport position. Wheels 30 and 32 sustain a portion of the loads of the wing members 26, while seed tanks 42 are supported by rear frame 20. Further, the embodiment shows row units 38 attached to and supported by rear frame 20 and wing frames 34. The draft tubes 24 may be coupled to hitch assembly 12, enabling the draft tubes 24 to release, thereby enabling wing members 26 to fold rearward during transport, as shown by arrow 50. As previously discussed, actuators may be attached to wing members 26 to enable the wing members 20 to fold to a transport position. It should be understood that the illustrations of FIGS. 5 and 6 are intended to show the wings in various positions, especially with reference to the planting and lowered positions 47. In an embodiment, the raising and folding of both wing frames 34 and members 20 of an implement 10 may occur at the same time, where both wing assemblies look like the left sides of FIG. 5 or 6.

In an embodiment, the transition to a folded transport position of implement 10 may start as shown in FIG. 1, with the wing members 20 extended and wing frames 34 in a ground engaging position 47. Then both left and right wing frames 34 may be raised into position 46, shown in FIG. 3. Finally, each of the wing members may be folded rearwardly in direction 39, as illustrated in FIG. 6, to a narrow transport position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
a hitch assembly including a first end coupled to a hitch and a spaced-apart second end, the hitch assembly configured to transfer lateral forces to a tow vehicle as the agricultural system is towed across a field;
a central boom coupled to the second end of the hitch assembly by a pivotal coupling and supported at each end by first ground engaging wheels, the central boom extending transverse to a direction of travel;
wing members coupled at each end of the central boom and extending therefrom, the wing members each pivotably coupled at one end to the central boom and having a spaced-apart opposite free end, each of the wing members supported by wing wheels near the free end, each wing member cooperating with the central boom to extend transverse to a direction of travel when the agricultural assembly is in a working position, the wing members configured to move between the working position and a folded transport position;
a rear frame including a first end rigidly coupled to the central boom, a spaced-apart second end and an elongated portion positioned therebetween, the rear frame extending aft of the central boom and supported at the second end by second ground engaging wheels;
wing frames pivotally coupled to each wing member and extending aft therefrom when in the working position, the wing frames supporting a plurality of row units rearward of the central boom, the wing frames configured to be movable between a ground-engaging position aft of its respective wing member when in the working position and a raised position substantially above its respective wing member when in the folded transport position; and
actuators for moving wing members and their respective wing frames between the working position and the folded transport position, at least some actuators spanning pivotal joints between the wing frames and each wing member;
wherein when the agricultural assembly is moved from the working position to the folded transport position, the actuators are activated to pivotably move the wing frames of the wing members from the ground-engaging position to the raised position above their respective wing member, and to move each wing member rearward such that each wing member is positioned in the folded transport position next to and substantially parallel to the elongated portion of the rear frame such that the wing member and its associated wing frames are positioned substantially between the first ground engaging wheels under the central boom and the second ground engaging wheels under the rear frame such that the wing wheels, the second ground engaging wheels of the rear frame and the first ground engaging wheels of the central frame carry the weight of each wing member and its respective wing frames when the agricultural assembly is positioned in the folded transport position such that no significant weight from each wing member and its associated wing frames is transmitted to the hitch assembly.

2. The system of claim 1, wherein the second ground engaging wheels are not pivotal with respect to the rear frame.

3. The system of claim 1, comprising a bulk seed tank coupled to and supported by the rear frame.

4. The system of claim 1, wherein the hitch assembly comprises an A frame.

5. The agricultural assembly of claim 1, wherein no substantial portion of any wing frame and no wing member extends forward of the central boom.

6. The agricultural assembly of claim 1, wherein no significant weight from each wing members and its associated wing frames is transmitted to the hitch.

7. The agricultural assembly of claim 1, wherein no vertical force is transmitted to the hitch assembly.

8. The agricultural assembly of claim 7, wherein no vertical force is transmitted to the hitch.

9. The agricultural assembly of claim 7, wherein the central boom and the first ground engaging wheels and the rear frame and the second ground engaging wheels support the wing frames and their respective wing members as they are raised without transferring a vertical force to the hitch assembly.

10. The agricultural assembly of claim 1, wherein the central boom is pivotally coupled to the wing members to enable the plurality of row units to conform to elevation changes as the agricultural system is towed across the field.

11. An agricultural system comprising:
a hitch assembly including a first end coupled to a hitch and a spaced-apart second end, the hitch assembly configured to transfer lateral forces to a tow vehicle as the agricultural system is towed across a field;
a central boom positioned aft of the hitch assembly, the central boom is coupled to the hitch assembly by a pivotal coupling and supported at each end by first ground engaging wheels, the central boom extending transverse to a direction of travel;
wing members coupled at each end of the central boom and extending therefrom, the wing members each pivotally coupled at one end to the central boom and having a spaced-apart opposite free end, each of the wing members supported by wing wheels near the free end, each wing member cooperating with the central boom to extend transverse to a direction of travel when the agricultural assembly is in a working position, the wing members configured to move between the working position and a folded transport position;
a rear frame including a first end rigidly coupled to the central boom, a spaced-apart second end and an elongated portion positioned therebetween, the rear frame extending aft of the central boom and supported at the second end by second ground engaging wheels;
wing frames pivotally coupled to each wing member and extending aft therefrom when in the working position, the wing frames supporting a plurality of row units rearward of the central boom, the wing frames configured to be movable between a ground-engaging position aft of its respective wing member when in the working position and a raised position substantially above its respective wing member when in the folded transport position;
wherein when the agricultural assembly is moved from the working position to the folded transport position, the wing frames of the wing members are pivotably moved from the ground-engaging position to the raised position above their respective wing member, and each wing member is pivotably moved rearwardly such that each wing member is positioned in the folded transport position next to and substantially parallel to the elongated portion of the rear frame such that the wing member and its associated wing frames are positioned substantially between the first ground engaging wheels under the central boom and the second ground engaging wheels under the rear frame such that the wing wheels, the second ground engaging wheels of the rear frame and the first ground engaging wheels of the central frame carry the weight of each wing member and its respective wing frames when the agricultural assembly is positioned in the folded transport position such that no significant weight from each wing member and its associated wing frames is transmitted to the hitch assembly.

12. The system of claim 11, comprising a bulk seed tank coupled to and supported by the rear frame.

13. The agricultural system of claim 11, further comprising actuators for moving the wing members and their associated wing frames between the working position and the folded transport position.

14. The agricultural assembly of claim 11, wherein no substantial portion of any wing frame and no wing member extends forward of the central boom.

15. The agricultural assembly of claim 11, wherein no significant weight from each wing members and its associated wing frames is transmitted to the hitch.

16. The agricultural assembly of claim 11, wherein no vertical force is transmitted to the hitch assembly.

17. The agricultural assembly of claim 16, wherein no vertical force is transmitted to the hitch.

18. The agricultural assembly of claim 16, wherein the central boom and the first ground engaging wheels and the rear frame and the second ground engaging wheels support the wing frames and their respective wing members as they are raised without transferring a vertical force to the hitch assembly.

* * * * *